(12) United States Patent
Droz et al.

(10) Patent No.: US 6,822,964 B1
(45) Date of Patent: *Nov. 23, 2004

(54) METHOD AND SYSTEM FOR SENDING FRAMES OF DATA FROM A PLURALITY OF INGRESSES TO ONE EGRESS IN AN ATM NETWORK

(75) Inventors: Patrick Droz, Glattbrugg (CH); Douglas Dykeman, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/446,487
(22) PCT Filed: Jun. 25, 1997
(86) PCT No.: PCT/IB97/00780
§ 371 (c)(1),
(2), (4) Date: Dec. 21, 1999
(87) PCT Pub. No.: WO98/59520
PCT Pub. Date: Dec. 30, 1998
(51) Int. Cl.[7] .......................... H04L 12/28; H04L 12/56
(52) U.S. Cl. .................... 370/395.3; 370/399; 370/389; 370/392
(58) Field of Search .......................... 370/395.3, 395.1, 370/395.2, 395.6, 395.63, 396, 399, 230.1, 235, 236, 397, 428, 465, 473, 466, 389, 392

(56) References Cited

U.S. PATENT DOCUMENTS 6,148,000 A * 11/2000 Feldman et al. ............ 370/397
6,243,381 B1 * 6/2001 Cai et al. ..................... 370/392
2001/0036189 A1 * 11/2001 Cai et al. ..................... 370/395

FOREIGN PATENT DOCUMENTS

| JP | 01-160131 | 6/1989 | |
| JP | 04-351038 | 12/1992 | |
| JP | 10-257068 | 9/1998 | |
| JP | 10-313314 | 11/1998 | |
| WO | 0687088 | 12/1995 | ........... H04L/12/18 |

OTHER PUBLICATIONS

Gauthier E et al: "Smart: A Many–to–Many Multicast Protocol for ATM" IEEE Journal on Selected Areas in Communications, vol. 15, No. 3, Apr. 1997.

Huang C et al: "A Thread–Based Interface for Collective Communication on ATM Networks" Proceedings of the International Conference on Distributed Computin Systems, Vancouver, May30–Jun. 2, 1995, No. Conf. 15, May 30, 1995, Institute of Electrical and Electronics Engineers.

* cited by examiner

*Primary Examiner*—Seema S. Rao
*Assistant Examiner*—Ronald Abelson
(74) *Attorney, Agent, or Firm*—Daniel E. McConnell

(57) ABSTRACT

A method is described for sending frames of data from at least two ingresses to one egress in an ATM network. Each frame of data to be sent is partitioned into cells. The egress creates an identification for each of the ingresses and sends the identification to the ingresses. Each of the ingresses includes the received identification in each of the cells and sends the cells to the egress. And then, the egress combines the received cells into frames depending on the included identification.

16 Claims, 3 Drawing Sheets

Figure 1:
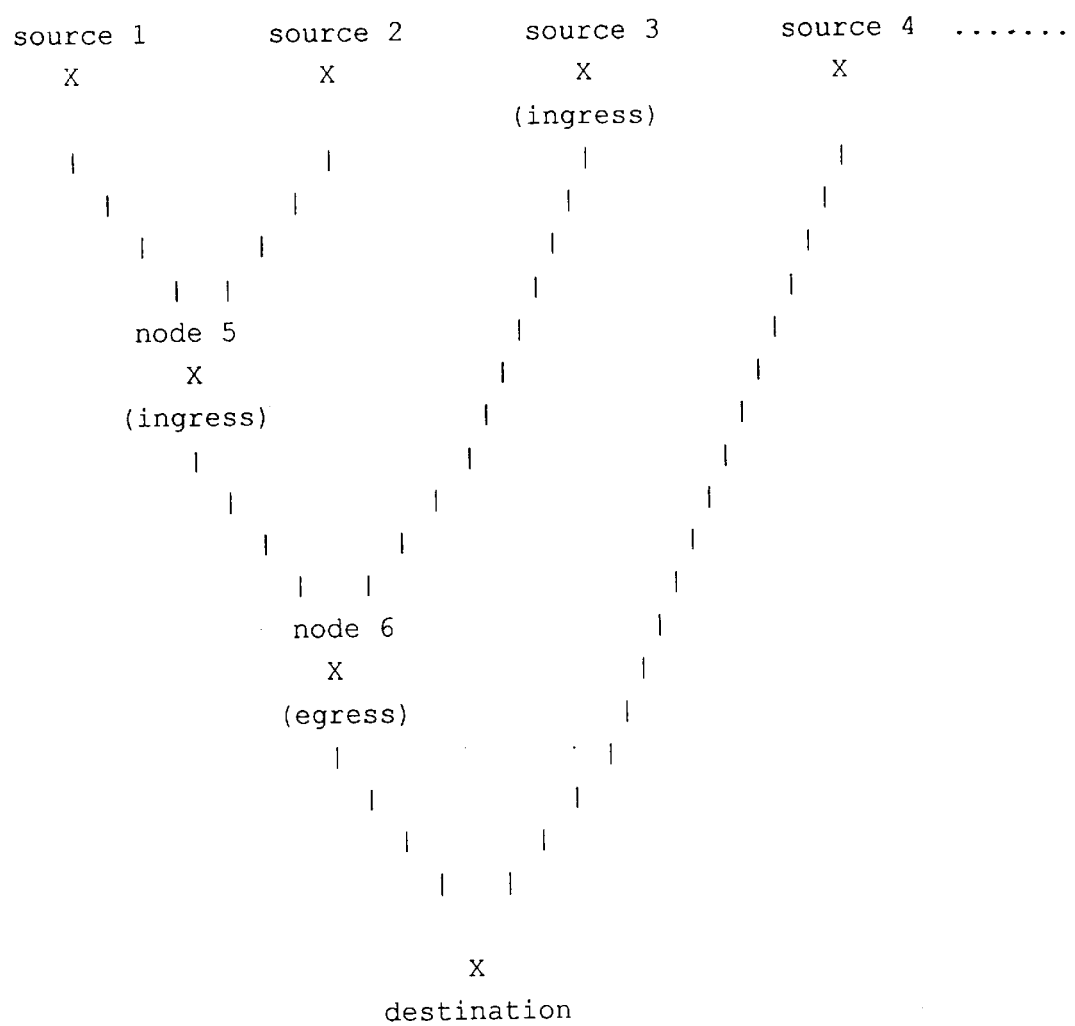

| egress, i.g. destination | each ingress, e.g. each source |
|---|---|
| creates ID=1 | |
| includes ID in SETUP/ADD PARTY | |
| sends SETUP/ADD PARTY to ingress | |
| increments ID | |
| | receives SETUP/ADD PARTY from egress |
| | extracts ID |
| | includes ID in VCI of all cells of frame |
| | sends cells to egress |
| receives cells with VCI from ingresses | |
| extracts IDs | |
| combines cells with identical IDs into frames | |

Figure 2

```
level 1          level 2          level 3          ...

0 - 4999         0 - 499          0 - 49
                                  50 - 99
                                  100 - 149
                                  ...

500 - 999        500 - 549
                                  550 - 599
                                  ...

1000 - 1499      1000 - 1049
                                  ...

...

5000 - 9999      ...

10000 - 14999    ...

...
```

Figure 3

METHOD AND SYSTEM FOR SENDING FRAMES OF DATA FROM A PLURALITY OF INGRESSES TO ONE EGRESS IN AN ATM NETWORK

The invention relates to a method for sending frames of data from at least two ingresses to one egress in an ATM network wherein each frame of data is partitioned into cells. Furthermore, the invention relates to an apparatus for sending as well as to an apparatus for receiving a frame of data in an ATM network wherein the frame of data is partitioned into cells.

ATM (asynchronous transfer mode) networks are well known and wide spread over the world. In an ATM network, the data to be transferred is put together in a frame which consists of a number of cells. The number of the cells depends on the amount of data to be transferred. Each of the cells includes 48 bytes data information and 5 bytes control information. The control information carries all necessary information for transferring the cell from its source to a desired destination. The control information includes a VPI (virtual path identifier) field and a VCI (virtual channel identifier) field. In particular the VPI field identifies the desired path of the data and is therefore an important feature of the respective connection.

The cells are sent from the source via a number of nodes to the destination. Each of these nodes between the source and the destination represents a source for its downstream node and is therefore called an ingress. As well, each of these nodes represents a destination for its upstream node and is therefore called an egress.

The connection between the source and the destination is called a point-to-point connection. There is only one path without any spreading or merging of other paths. As already mentioned, any such point-to-point connection is identified by its specific VPI field.

Another possibility is a point-to-multipoint connection. In this case, one source broadcasts the same data to a number of destinations. For that purpose, the ATM network provides a SETUP message and an ADD PARTY message. With the SETUP message, a point-to-point connection is established. Then, with the ADD PARTY message, it is possible to add further destinations to this point-to-point connection and to thereby build up the point-to-multipoint connection.

Each point-to-multipoint connection is identified by its specific VPI field. It includes one ingress which is followed by at least two egresses in order to spread the data to be transferred from the single source to the number of destinations. As there is only one source relating to one and the same VPI field, all cells arriving in the destinations and having an identical VPI field come from the same source. Cells from other sources can be seperated by their different VPI fields. Therefore, no problem arises in the destinations to combine the frame originally sent from the single source out of the received cells.

It is also possible to reverse the point-to-multipoint connection into a multipoint-to-point connection. For this purpose, a reverse tag may be included in the SETUP message and in the ADD PARTY message. Again, each specific multipoint-to-point connection is identified by its VPI field.

Such a multipoint-to-point connection includes at least two ingresses which are followed by only one egress. Thereby, the data to be transferred is merged together from the number of sources to the single destination. This has the consequence that cells from different sources may be interleaved when they are merged together. The cells arriving at the single destination are therefore mixed with respect to their different sources and have to be reassembled appropriately. As the VPI field of one and the same multipoint-to-point connection is identical for all cells sent from all sources, it is not possible to reassemble the cells of the different sources by the VPI field. Therefore, a mechanism is needed to reassemble the cells from the different sources correctly in the single destination.

A first mechanism is that each egress collects all cells that arrive on a specific input port and that have the same VPI field until the egress has collected all cells of one and the same frame. Then, these collected cells are forwarded to the next downstream egress continuously, i.e. no other cells from other ingresses are interleaved. Using this mechanism, the cells are not mixed and it is possible to reassemble the frames sent by the different sources as these frames arrive continuously at the single destination. However, this mechanism has the disadvantage that it introduces a significant delay in the transfer of the data.

In another mechanism, the VCI field of a cell is used to identify the particular source of the cell. Each source worldwide is assigned with a globally unique value which is then included by the source in the VCI field of each cell to be sent by the source. Due to the unique configuration, all cells arriving at a destination and having an identical value may then be reassembled into the same frame. This mechanism does not introduce a delay but it requires a globally unique assignment of values for the VCI field which is practically very difficult to guarantee.

It is therefore an object of the invention to provide a method and an apparatus for a multipoint-to-point connection to reassemble the cells from the different sources effectively in the single destination.

In a method as described above, the invention solves this object by the steps of: the egress creates an identification for each of the ingresses and sends the identification to the ingresses, each of the ingresses includes the received identification in each of the cells and sends the cells to the egress, and the egress combines the received cells into frames depending on the included identification.

As well, in an apparatus for sending as described above, the invention solves this object by means for receiving an identification, means for including the identification in each of the cells of the frame, and means for sending the cells.

As well, in an apparatus for receiving as described above, the invention solves this object by means for creating an identification, means for sending the identification, means for receiving cells, and means for combining cells into frames depending on the included identification.

In the mechanism according to the invention, an egress, e.g. the destination, assigns an identification to each of the ingresses, and each of the ingresses, e.g. all sources, include this identification in its cells. The egress then receives all transmitted cells with the included identification. Depending on the identification, the egress is able to reassemble the cells correctly into the frames of the different ingresses.

The mechanism according to the invention does not introduce any delay as the cells are transferred without any collection in the ingresses in between. As well, the mechanism according to the invention does not require any global configuration as the egress assigns an identification to each of the ingresses. The mechanism according to the invention only requires that during the establishment of the multipoint-to-point connection the respective identifications are transferred from the egress to the ingresses. However, this requires only very minor additional processing which happens prior to the transfer of the data and which therefore does not influence the transfer of the data as such. Furthermore, the mechanism according to the invention requires that all ingresses include the respective received identifications in the cells to be transmitted. However, this also requires only very minor additional processing during the provision of the cells with their control information in the respective egresses which also happens prior to the transfer of data and which therefore does also not influence the transfer of the data as such.

In an advantageous embodiment of the invention, the identification is included in the SETUP and/or the ADD PARTY message in order to be transferred from the egress to the ingresses. As described, these messages are necessary to build up a multipoint-to-point connection. Therefore, the transfer of the identification from the egress to the ingresses does not require any additional time. It is sufficient to include the identification in the respective message and to transfer the message as usual.

In another advantageous embodiment of the invention the identification is included in the VCI field of the cells when being transferred back from the ingresses to the egress. By this inclusion, all of the cells are identified such that the egress knows from which ingress the cells comes from. In other words, by including the identification in the VCI field of the cells, all cells are identified with respect to their particular ingress. As already described, the VCI field is part of the control information of all cells and is therefore necessary to build up a cell. Therefore, the transfer of the identification in the VCI field does not require any additional time. It is sufficient to include the identification in the VCI field of each cell and to transfer the cell as usual.

Another advantageous embodiments of the invention comprises the further step of providing a number of identifications to each of the ingresses and then each of the ingresses providing one of the identifications to a requesting further ingress. This procedure enables the adaption of the mechanism according to the invention to cases in which the multipoint-to-point connection is not initiated by the destination but by one of the nodes in between. As well, this procedure enables that another new node joins the multipoint-to-point connection in a later point in time.

Further advantages of the invention become apparent from the following description of an embodiment of the invention which is shown in the figures of the drawing.

FIG. 1 shows a schematic diagram of a multipoint-to-point connection in an ATM network with a number of sources and one destination, FIG. 2 shows a schematic diagram of a method for sending frames of data from the number of sources to the destination in the multipoint-to-point connection of FIG. 1, and FIG. 3 shows a schematic diagram of three levels of identifications.

FIG. 1 shows a multipoint-to-point connection in an ATM network. Four sources 1 to 4 are provided which are connected via two further nodes to a destination. Source 1 and source 2 are both connected to node 5. Source 3 and node 5 are connected to node 6. And source 4 and node 6 are connected to the destination.

Any node in FIG. 1 represents an ingress for its downstream nodes and an egress for its upstream nodes. In particular, source 3 and node 5 each represent an ingress, i.e. a source for the downstream node 6 which itself represents an egress, i.e. a destination for the upstream source 3 and node 5.

In the multipoint-to-point connection of FIG. 1, data is transferred from the sources 1 to 4 to the destination. The multipoint-to-point connection is part of an ATM network. Therefore, the data is transferred in frames, i.e. all data to be transferred from one of the sources 1 to 4 to the destination is included in one frame. The protocol for these transfers is e.g. the Internet Protocol IP.

Each frame consists of a number of cells. The data to be transferred is partitioned into these cells. Each cell carries 48 bytes data information and 5 bytes control information. The control information includes a virtual path identifier VPI field which identifies in particular the destination to which the data has to be transferred. Furthermore, the control information includes a virtual channel identifier VCI field.

To build up a multipoint-to-point connection, the destination first of all creates a SETUP message which establishes a point-to-point connection. In order to create a reverse point-to-point connection, a reverse tag is included in the SETUP message.

According to FIG. 2, the destination furthermore creates an identification ID which is represented by a counter and which is initially set to ID=1. This identification ID=1 is included in the SETUP message. Then, the complete SETUP message including the identification ID=1 is sent to one of the desired sources 1 to 4. The counter for the identification is incremented to ID=2.

After sending the SETUP message, the destination creates an ADD PARTY message. Again, a reverse tag is included in order to establish a multipoint-to-point connection and not a point-to-multipoint connection.

Furthermore, the destination includes the incremented identification ID=2 in the ADD PARTY message and then sends the ADD PARTY message to the next one of the desired sources 1 to 4. The counter for the identification is incremented again to be ID=3.

This procedure of creating an ADD PARTY message and of sending the ADD PARTY message including consecutive identifications ID=3, ID=4, . . . is repeated until all of the desired sources 1 to 4 have received the SETUP message or the ADD PARTY message. The identification ID=1, ID=2, ID=3 and ID=4 thereby identifies the respective sources 1 to 4.

When the SETUP message or the ADD PARTY message is sent to one of the sources 1 to 4, the respective source 1, 2, 3 or 4 receives the SETUP message or the ADD PARTY message and extracts the identification out of the message. The identification is stored in the respective source 1, 2, 3 or 4, e.g. ID=3 is stored in the source 3.

When e.g. the source 3 wants to send data to the destination, it partitions the data into cells as described above. All these cells represent the frame of the data. Then, according to FIG. 2, the source 3 includes the stored identification, e.g. ID=3, in the VCI field of each of the cells of the frame of data to be transmitted. The cells including the identification in the VCI field are then transmitted to the destination.

On their way from the source 3 to the destination, the cells pass the node 6 which represents an egress for the source 3 and the node 5. If the node 6 receives at the same time cells from the source 3 and from the node 5, these cells may be interleaved at the output port of the node 6. This means that cells received from the source 3 and cells received from the node 5 may be mixed arbitrarily when they are transmitted from the node 6 to the destination. Although the cells may be interleaved in the described manner, the sequence of the cells is not changed. This means that none of the cells of one and the same source surpasses its predecessor.

The destination receives the cells sent from the node 6. As described, these cells may originate from the source 3 or the node 5. Furthermore, the destination may also receive cells from the source 4. The destination then extracts from the VCI field of each of the received cells the respective identification. Depending on this identification, the destination then combines the received cells into frames.

For that purpose, the destination combines all cells with an identical identification, e.g. ID=3, consecutively into one frame. As mentioned, the sequence of the cells is not changed. Therefore, no adaption in this respect is necessary. As a consequence, the destination is able to combine the cells correctly in the respective frames of the different sources.

From the control information of the cells, the destination is able to recognize the last cell of such a frame. As the destination itself has assigned the identifications to the several sources, it therefore is also able to assign the received frame to the correct source, e.g. source 3. Therefore, it is possible for the destination to reassemble the frames completely and correctly and to assign the reassembled frames to the correct source.

In the case of multipoint-to-point connections which are not initiated by the destination but by anyone of the nodes of the connection the described mechanism has to be adapted.

FIG. 3 shows a number of identifications which are ordered in three levels. If, e.g. node 6 initiates the multipoint-to-point connection of FIG. 1 from the sources 1 to 4 to the destination, then node 6 provides the identifications of the level 1 to its adjacent nodes. E.g. the identifications 0 to 4999 are provided to the node 5, the identifications 5000 to 9999 are provided to the source 3 and the identifications 10000 to 14999 are provided to the destination. Then, these adjacent nodes provide the received identifications to their adjacent nodes. E.g. the identifications 0 to 499 are provided to source 1 and the identifications 500 to 999 are provided to source 2. In the same manner, the identifications 10000 to 10499 are provided to the source 4.

This procedure is continued until all nodes have received identifications. Of course, the number of levels may be greater than three and in a real implementation one would use binary figures.

One of the received identifications is then assigned to the node itself. As each of the nodes does usually receive more than one identification, it is always possible that this node provides the other identifications to other new nodes. This may even happen in a later point in time when these new nodes request to join the multipoint-to-point connection.

What is claimed is:

1. Method for sending frames of data from a plurality of ingresses to one caress in an ATM network, the method comprising the steps of:

assigning an identification at the egress to each of the ingresses in the network and incrementing a counter each time an identification is assigned to an ingress;

sending each identification from the egress to its assigned ingress;

receiving at each ingress the identification assigned at the egress;

partitioning frame data into cells at an ingress;

including in each of the cells of partitioned frame data the identification assigned to an ingress where partitioning occurs;

sending cells of frame data from said plurality of ingresses to the egress;

receiving, at the egress, cells sent from said plurality of ingresses; and combining the cells received at the egress into frames of data depending on the included identification.

2. Method according to claim 1 wherein the step of sending each identification from the egress to its assigned ingress comprises the step of: including the identification in a SETUP messages.

3. Method according to claim 2 wherein the step of receiving at each ingress the identification assigned at the egress comprises the step of extracting the identification from the SETUP message.

4. Method according to claim 1 wherein the identification assigned to an ingress is included in a VCI field of the cells.

5. Method according to claim 4 wherein the step of combining the cells received at the egress into frames depending on the included identification comprises the step of: extracting the identification from the VCI field of the cell.

6. Method for sending frames of data from a plurality of ingresses to one egress in an ATM network, the method comprising the steps of:

assigning at the egress a plurality of identifications to each ingress in the network;

sending each identification from the egress to its assigned ingress;

receiving at each ingress the identification assigned at the egress;

partitioning frame data into cells at an ingress;

including in each of the cells of partitioned frame data the identification assigned to an ingress where partitioning occurs;

sending cells of frame data from said plurality of ingresses to the egress;

receiving, at the egress, cells sent from said plurality of ingresses; and combining the cells received at the egress into frames of data depending on the included identification.

7. Method according to claim 6 wherein an existing network ingress assigns an identification to a requesting ingress added to the network.

8. System from sending frames of data partitioned into cells within an ATM network, comprising:

a plurality of ingresses; and an egress connected to said plurality of ingress through paths in the ATM network, said egress assigning an identification to each ingress in the network and sending the identification to its assigned ingress where, after being received by an ingress, the identification is included in cells of partitioned frame data sent by an ingress to the egress, such that when one ingress in the network sends cells of frame data to the egress, the egress can combine the cells received into frame based on the included identification, said egress including a counter which is incremented each time an identification is assigned to an ingress.

9. System according to claim 8, wherein the identification is sent from the egress to an ingress in a SETUP message.

10. System according to claim 9, wherein an ingress extracts the identification from the SETUP message.

11. System according to claim 8, wherein the identification is sent from the egress to an ingress is in an ADD PARTY message.

12. System according to claim 11, wherein an ingress extracts the identification from the ADD PARTY message.

13. System according to claim 8, wherein the identification assigned to an ingress is included in a VCI field of cells of partitioned frame data sent by an ingress to the egress.

14. System according to claim 13, wherein the identification used to combine the cells received by the egress into frames is extracted from the VCI field of the received cells.

15. System according to claim 8, wherein the egress assigns a plurality of identifications to each ingress to the network.

16. System according to claim 15, wherein an existing ingress of the network assigns an identification to a requesting ingress added to the network.

* * * * *